United States Patent [19]
Matsuda

[11] Patent Number: 5,301,173
[45] Date of Patent: Apr. 5, 1994

[54] OPTICAL RECORDING APPARATUS WITH TWO TRACKING ERROR SIGNALS

[75] Inventor: Norio Matsuda, Tsurugashima, Japan

[73] Assignee: Pioneer Electronic Corporation, tokyo, Japan

[21] Appl. No.: 47,389

[22] Filed: Apr. 19, 1993

Related U.S. Application Data

[63] Continuation of Ser. No. 782,962, Oct. 25, 1991, abandoned.

[30] Foreign Application Priority Data

Mar. 6, 1991 [JP] Japan .................................. 3-40180

[51] Int. Cl.$^5$ .............................................. G11B 7/095
[52] U.S. Cl. ........................... 369/44.250; 369/44.280; 369/44.320; 369/43; 369/53; 369/54; 369/126
[58] Field of Search ............... 369/44.25, 44.32, 54, 369/58, 32, 116, 112, 126, 88, 44.28, 53, 50, 43, 189, 244-247, 264, 270, 75.1, 75.2, 292, 100

[56] References Cited

U.S. PATENT DOCUMENTS

| | | | |
|---|---|---|---|
| 5,023,857 | 6/1991 | Verboom | 369/44.32 |
| 5,042,021 | 8/1991 | Nagano et al. | 369/44.32 |
| 5,058,089 | 10/1991 | Yoshimaru et al. | 369/54 |
| 5,086,419 | 2/1992 | Yanagi | 369/44.28 |
| 5,109,374 | 4/1992 | Tsunoda et al. | 360/100 |
| 5,189,653 | 2/1993 | Yanagi | 369/44.32 |

*Primary Examiner*—W. R. Young
*Assistant Examiner*—Muhammad Edun
*Attorney, Agent, or Firm*—Sughrue, Mion, Zinn, Macpeak & Seas

[57] ABSTRACT

When an information signal is recorded by irradiating a laser beam onto an optical recording disc, a carriage error signal corresponding to a deviation of an irradiating position of a carriage in the disc radius direction and a disc error signal corresponding to the deviation in the radial direction of the disc are combined, thus obtaining a composite error signal for controlling the translation of the carriage.

6 Claims, 7 Drawing Sheets

OPTICAL RECORDING APPARATUS WITH TWO TRACKING ERROR SIGNALS

This is a continuation of application Ser. No. 07/782,962, filed Oct. 25, 1991, now abandoned.

BACKGROUND OF THE INVENTION

1. Field of the Invention

The invention relates to a recording apparatus for recording an information signal onto an optical recording disc such as a glass master disc or the like.

2. Description of Background Information

Figure 1:
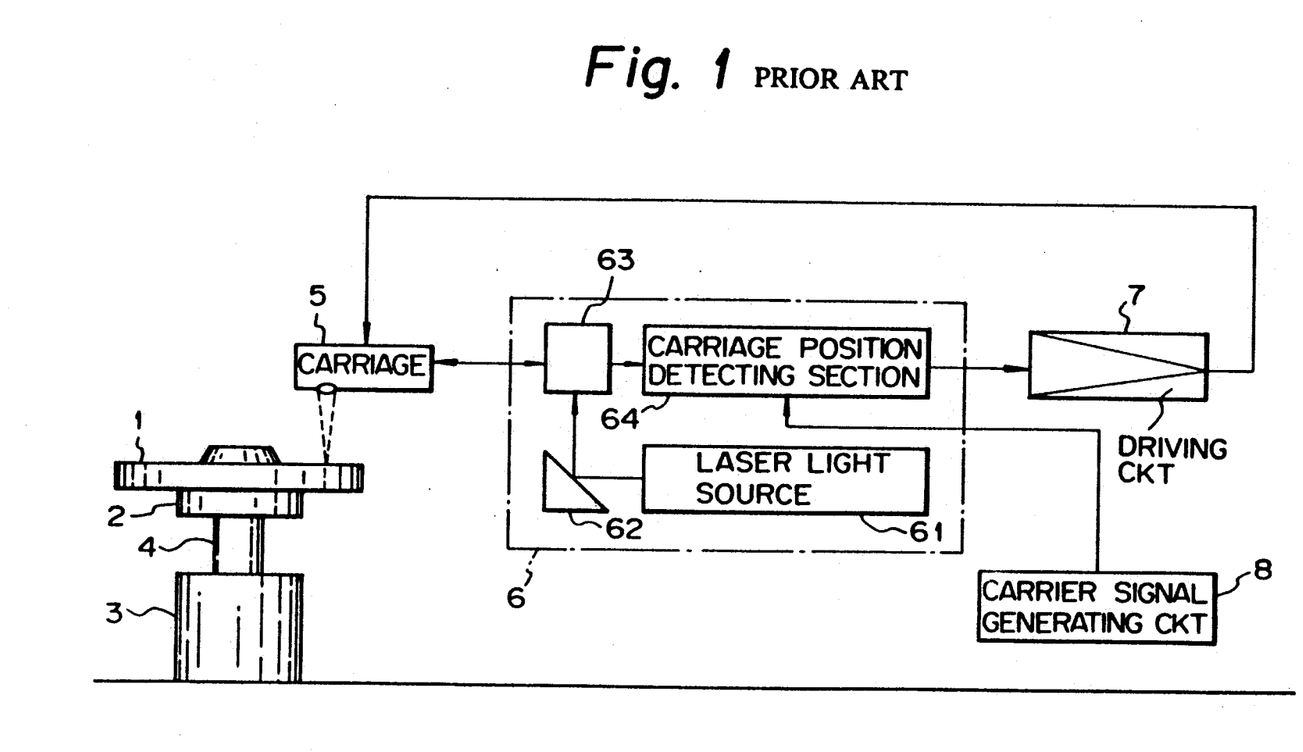
FIG. 1 is a block diagram of a conventional optical recording apparatus.

In the case where a laser beam is irradiated onto an optical recording disc such as a glass master disc or the like and tracks are concentrically or spirally formed and an information signal is recorded, the signal must be recorded so that the distance between adjacent two tracks is always maintained constant. To realize such a recording state, recording of the signal is performed while a carriage, from which the laser beam is irradiated, is translated in a radial direction of the disc at a predetermined feed rate. In FIG. 1, a disc 1 is supported by a turntable 2 and is rotated by a rotary shaft 4 of a spindle motor 3 as rotational driving means. A carriage 5 is arranged so as to be movable in the radial direction of the disc 1 and it generally serves as irradiating means for relaying a laser beam carrying an information signal and irradiating the laser beam onto the disc 1, thereby recording the information signal.

In the figure, a laser length measuring apparatus 6 serving as position detecting means is provided, and a laser beam emitted from a laser light source 61 is reflected by a mirror 62 and enters a light interferometer 63. The light interferometer 63 is constructed of a polarization separating filter, a corner cube prism, etc. (all not shown). A part of the incident laser beam is irradiated on the side of the carriage 5 and is also irradiated on the corner cube prism. Two return beams which have been reflected by the side face of the carriage 5 and the corner cube prism, that is, an interference light is supplied to a carriage position detecting section 64. In the carriage position detecting section 64, by counting the number of light and dark interference fringes occurring in the two return beams, a detection signal is produced by accurately detecting the amount of displacement of the moving carriage 5. The detection signal is compared with a carrier signal of a DC voltage which is given by a carrier signal generating circuit 8 as carrier signal generating means, so that a carriage error signal is produced.

Figure 2A:
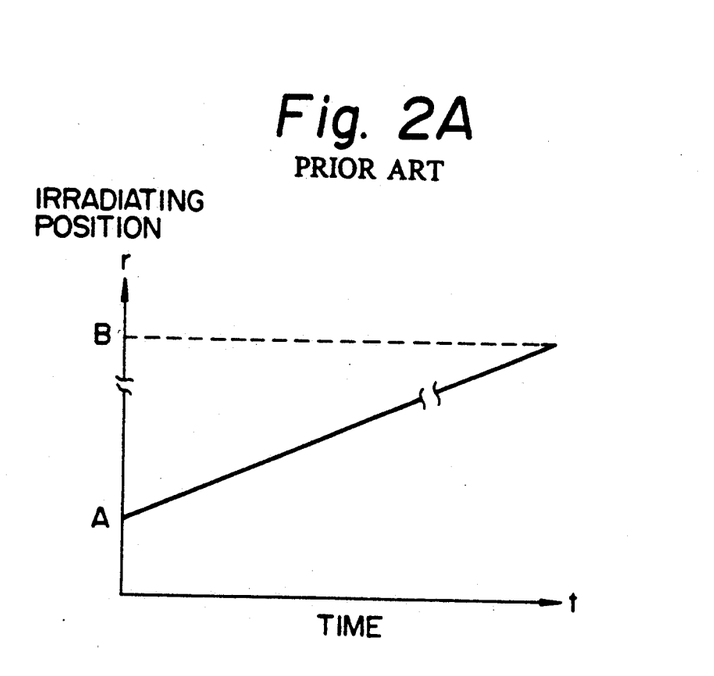
FIG. 2A is a graph showing the change of an irradiating position of a laser beam produced by a carriage 5 in FIG. 1.
Figure 2B:
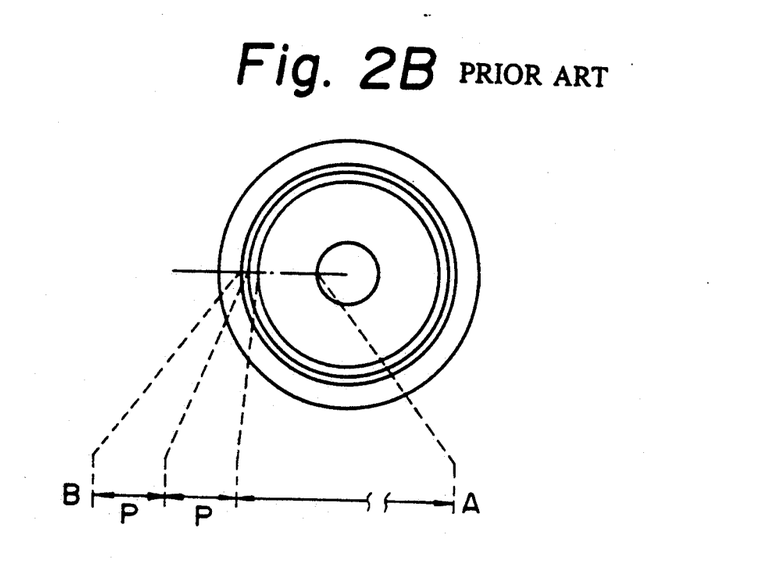
FIG. 2B is a diagram showing recording tracks which are formed on the disc 1 when the irradiating position of the laser beam is changed in the manner shown in the graph of FIG. 2A.

The carriage error signal is supplied to a driving circuit 7 as driving means and is power amplified and a driving signal corresponding to the carriage error signal is supplied to the carriage 5. By a feedback loop constructed as mentioned above, the carriage 5 is conveyed at a rate to completely eliminate the carriage error signal. In the case of conveying the carriage 5 at a constant velocity, there is a proportional relation between time t and the position of irradiation, namely, a position r in the radial direction of the disc 1 as shown in FIG. 2A. The spacing P between tracks, therefore, when the information signal is recorded on the tracks in a range from a point A to a point B on the disc is always constant as shown in FIG. 2B.

Figure 3A:
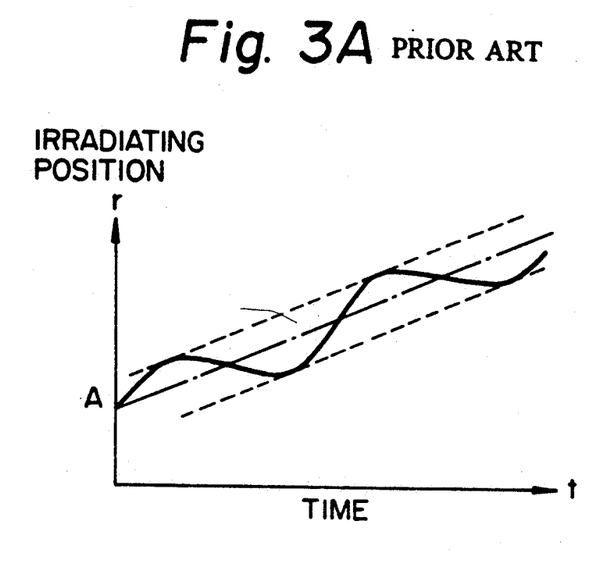
FIG. 3A is a graph in FIG. 2A when the disc 1 is displaced periodically.
Figure 3B:
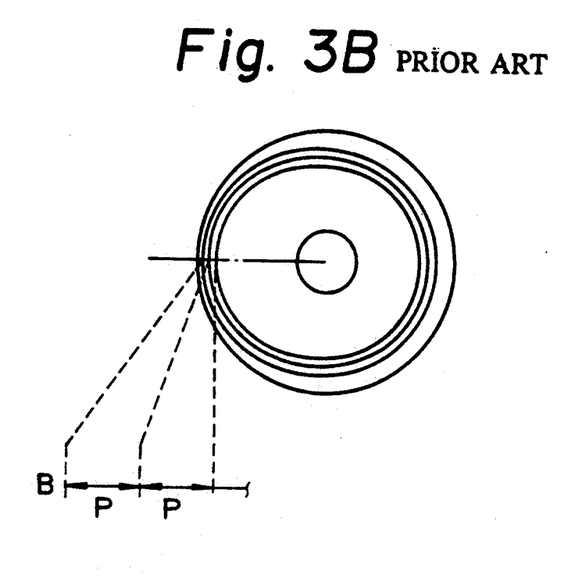
FIG. 3B is a diagram showing recording tracks on the disc 1 which are formed when the irradiating position of the laser beam is changed in the manner shown in the graph of FIG. 3A.
Figure 4A:
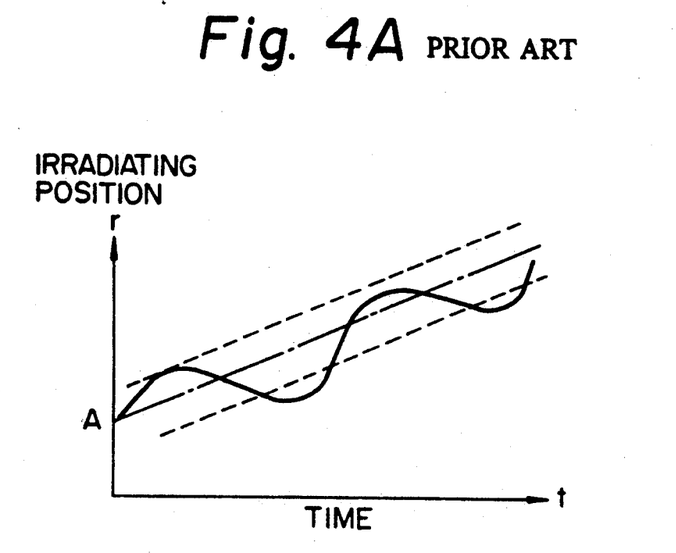
FIG. 4A is a graph in FIG. 3A when the disc 1 is displaced irregularly.
Figure 4B:
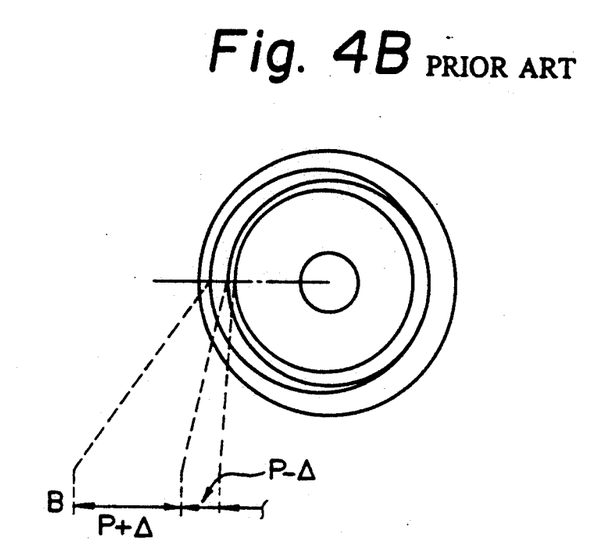
FIG. 4B is a diagram showing recording tracks on the disc 1 which are formed when the irradiating position of the laser beam is changed in a manner as shown in the graph of FIG. 4A.

In the case where the recording density is made high, however, such a track spacing is narrowed and a deviation of relative position between the disc 1 and the position of irradiation becomes larger than a negligible level due to a deviation of the rotary shaft caused by the vibration of the spindle motor 3. When the deviation of the rotary shaft occurs periodically in synchronism with the rotation of the spindle motor 3, the deviation of the irradiating position also becomes periodic in a predetermined range as shown in FIG. 3A. Consequently, the tracks take the form of eccentric circles as shown in FIG. 3B. However, the track spacing P is maintained constant. In the case where the deviation of the rotary shaft occurs irregularly, on the other hand, the deviation of the irradiation position exceeds a predetermined range as shown in FIGS. 4A and 4B, so that the constant track spacing is not maintained. Accordingly, there arises a problem that it is difficult to record the signal with the constant track spacing being maintained, only by measuring the amount of displacement of the moving carriage 5.

OBJECT AND SUMMARY OF THE INVENTION

It is, therefore, an object of the invention to provide an optical recording apparatus in which a predetermined track pitch can be maintained even if there is an irregular deviation of a rotary shaft due to the vibration of spindle motor.

An optical recording apparatus according to the invention comprises rotating driving means for rotating an optical recording disc; irradiating means for irradiating a laser beam carrying an information signal onto the disc and forming recording tracks; carrier signal generating means for generating a carrier signal; position detecting means for detecting the position of the irradiating means in a radial direction of the disc; error signal generating means for generating an error signal by comparing a detection signal and the carrier signal; and driving means for conveying the irradiating means in the radial direction of the disc in accordance with the error signal, wherein the position detecting means includes deviation detecting means for detecting a deviation in the radial direction of the disc and for generating a disc deviation signal and the error signal generating means includes combining means for superimposing the disc deviation signal to the error signal.

In the optical recording apparatus according to the invention, when the laser beam is irradiated onto the optical recording disc for recording the information signal, an error signal is formed by combining the carriage error signal, which is responsive to the deviation of the irradiating position of the carriage serving as the irradiating means in the disc radial direction, and the disc error signal responsive to the deviation of the disc in the radial direction.

DETAILED DESCRIPTION OF THE PREFERRED EMBODIMENTS

Figure 5:
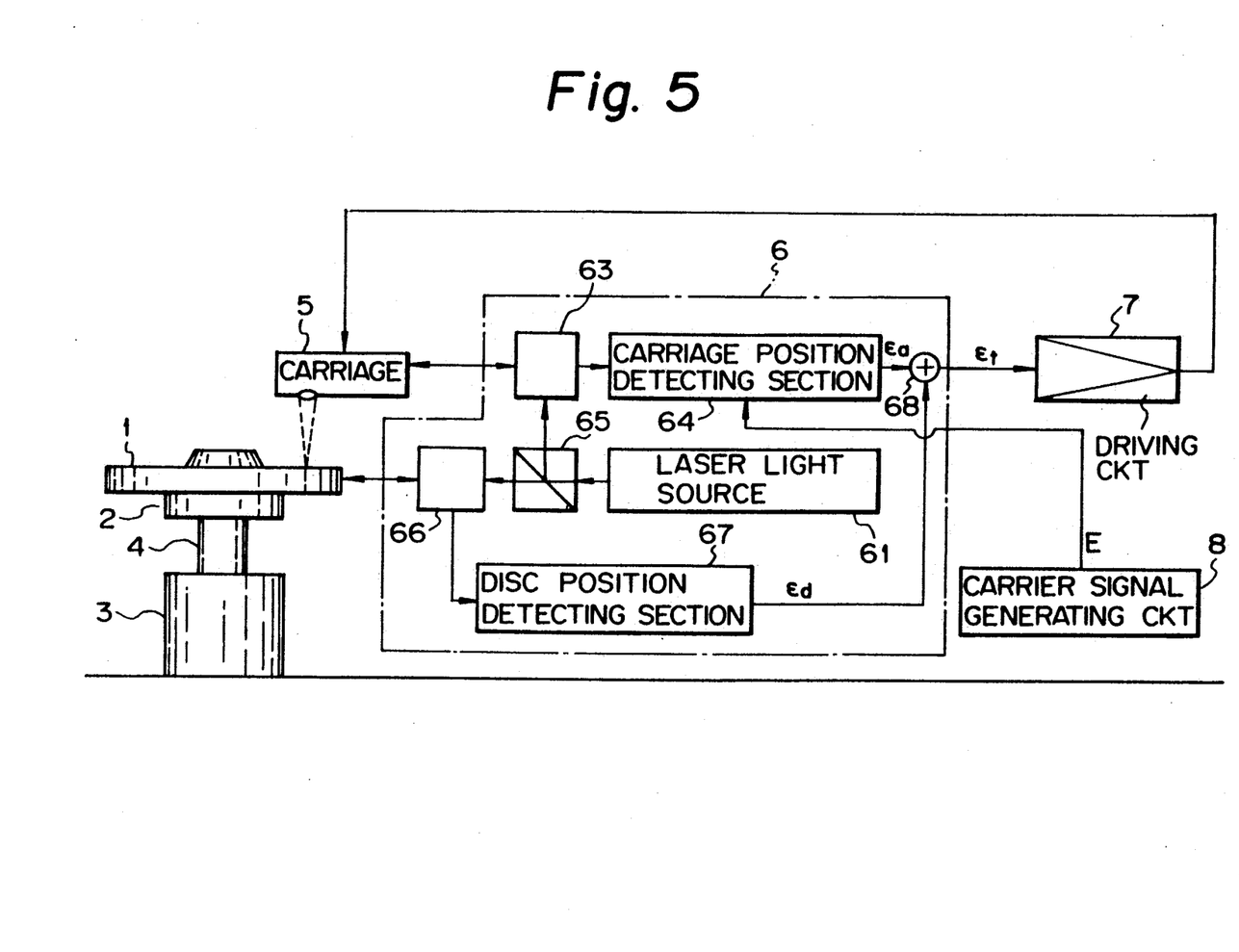
FIG. 5 is a block diagram of the first embodiment of an optical recording apparatus according to the invention.
Figure 6:
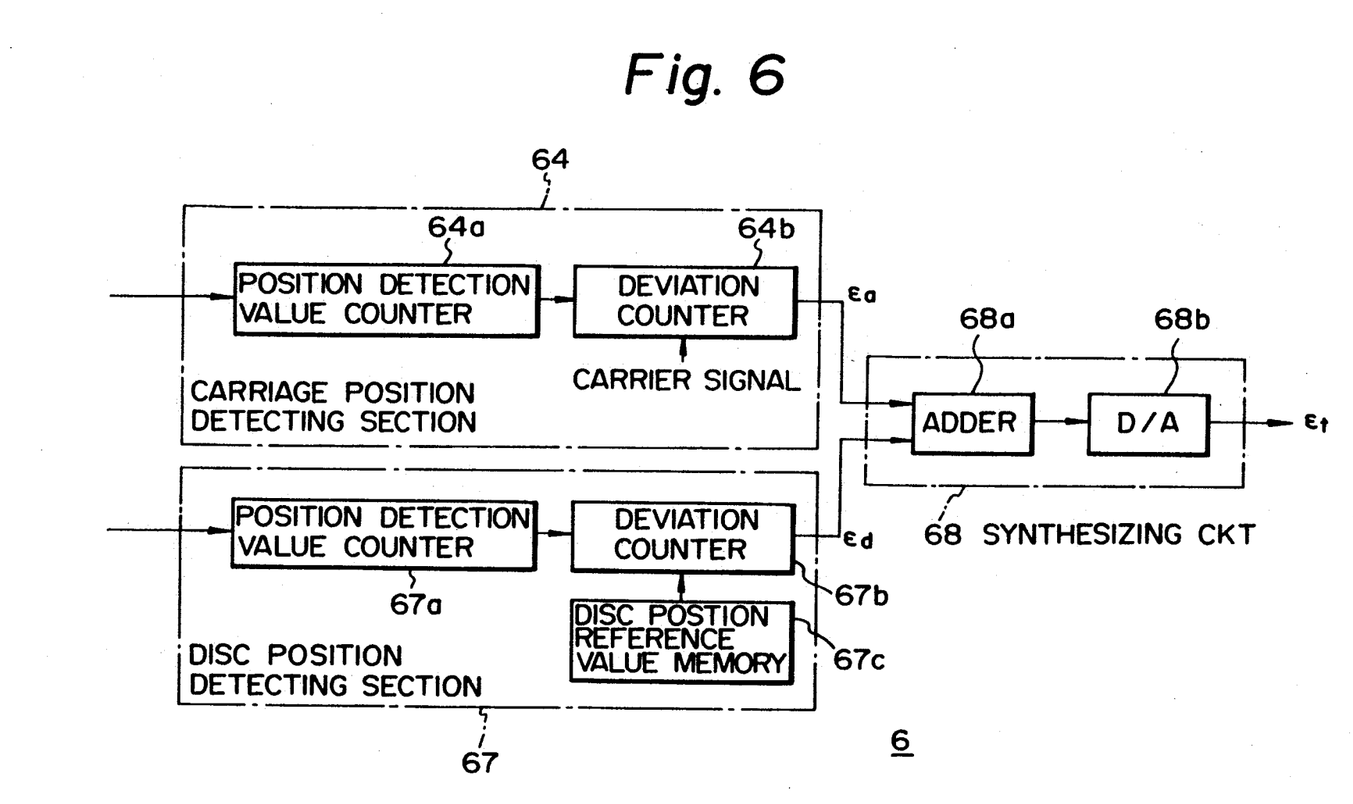
FIG. 6 is a detailed block diagram of a disc position detecting section 67 in FIG. 5.

An optical recording apparatus according to the invention will be described in detail hereinafter with reference to FIGS. 5 to 7. In the first embodiment shown in FIG. 5, components or elements the same as those in FIG. 1 are designated by the same reference numerals. A laser beam emitted from the laser light source 61 is separated into two directions by a beam splitter 65. One beam enters the interferometer 63 the same as that in FIG. 1 and the other beam passes through an interferometer 66 and is irradiated to the side edge surface of the disc 1. The return beam passes through an interferometer 66 and is irradiated to the side edge surface of the disc 1. The return beam which has been reflected by the side edge surface of the disc 1 again enters the interferometer 66. Then, the interference light is supplied to a disc position detecting section 67 as deviation detecting means. In the disc position detecting section 67 shown in FIG. 6, the number of light and dark interference fringes occurring in the interference light is counted by a position detection value counter 67a and position deviation data is supplied to a deviation counter 67b. In the deviation counter 67b, a difference between the position deviation data and reference data which has previously been stored in a disc position reference value memory 67c is produced from the disc position detecting section 67 as a disc error signal.

In the carriage position detecting section 64, in a manner similar to the above, present position data detected by a position detection value counter 64a from the interference light which is obtained from the reflected beam of the carriage 5 is supplied to a deviation counter 64b. In the deviation counter 64b, designated position data corresponding to the carrier signal from the carrier signal generating circuit 8 is compared with the present position data and a difference is generated from the carriage position detecting section 64 as a carriage error signal.

The two error signals are supplied to a combining circuit 68 as combining means and are added together by an adder 68a provided therein. After that, the addition signal is converted by a D/A converter 68b and an analog error signal is supplied to the driving circuit 7.

The operation of the apparatuses shown in FIGS. 5 and 6 will now be described. A disc position which will be used as a reference value when the disc 1 is set onto the turntable 2 is previously measured and is stored as reference data $[D_0]$ into the disc position reference value memory 67c. A value shown in [ ] indicates digital data (the same shall also apply hereinafter). During the recording operation, present position data $[C_p]$ of the carriage 5 is supplied from the position detection value counter 64a to the deviation counter 64b and is compared with designated position data $[C_d]$. Carriage error data $[\epsilon_a]$ as a conveyance error is obtained by the following equation.

$$[\epsilon_a]=[C_d]-[C_p]$$

The disc 1 is deviated in the radial direction by the vibration of the spindle motor 3. Position deviation data $[D_p]$ is supplied to the deviation counter 67b and is compared with the reference data $[D_0]$. Disc error data $[\epsilon_d]$ as a deviation amount is obtained by the following equation.

$$[\epsilon_d]=[D_0]-[D_p]$$

Combined error data $[\epsilon_t]$ which is derived from the adder 68a, therefore, is obtained as follows.

$$[\epsilon_t]=[\epsilon_a]+[\epsilon_d]$$

That is, the disc error signal of the disc 1 is superimposed on the carriage error signal, and the combined error signal is converted into the analog signal. The analog signal is amplified by the driving circuit 7 and is returned to the carriage 5. Since the carriage 5 is, therefore, translated so that both of the carriage error signal and the disc error signal are maintained at zero. In this way, the signal can be recorded while an accurate track spacing is maintained.

In the above first embodiment, a deviation amount of the disc 1 due to the vibration of the spindle motor 3 is directly detected. Since both of the turntable 2 and the rotary shaft 4, however, are also deviated in the radial direction of the disc 1 synchronously with the disc 1, the deviation of the disc can also be indirectly obtained by detecting the deviation amount of the turntable 2 or rotary shaft 4. In this case, the laser beam is irradiated to the turntable 2 or rotary shaft 4.

Figure 7:
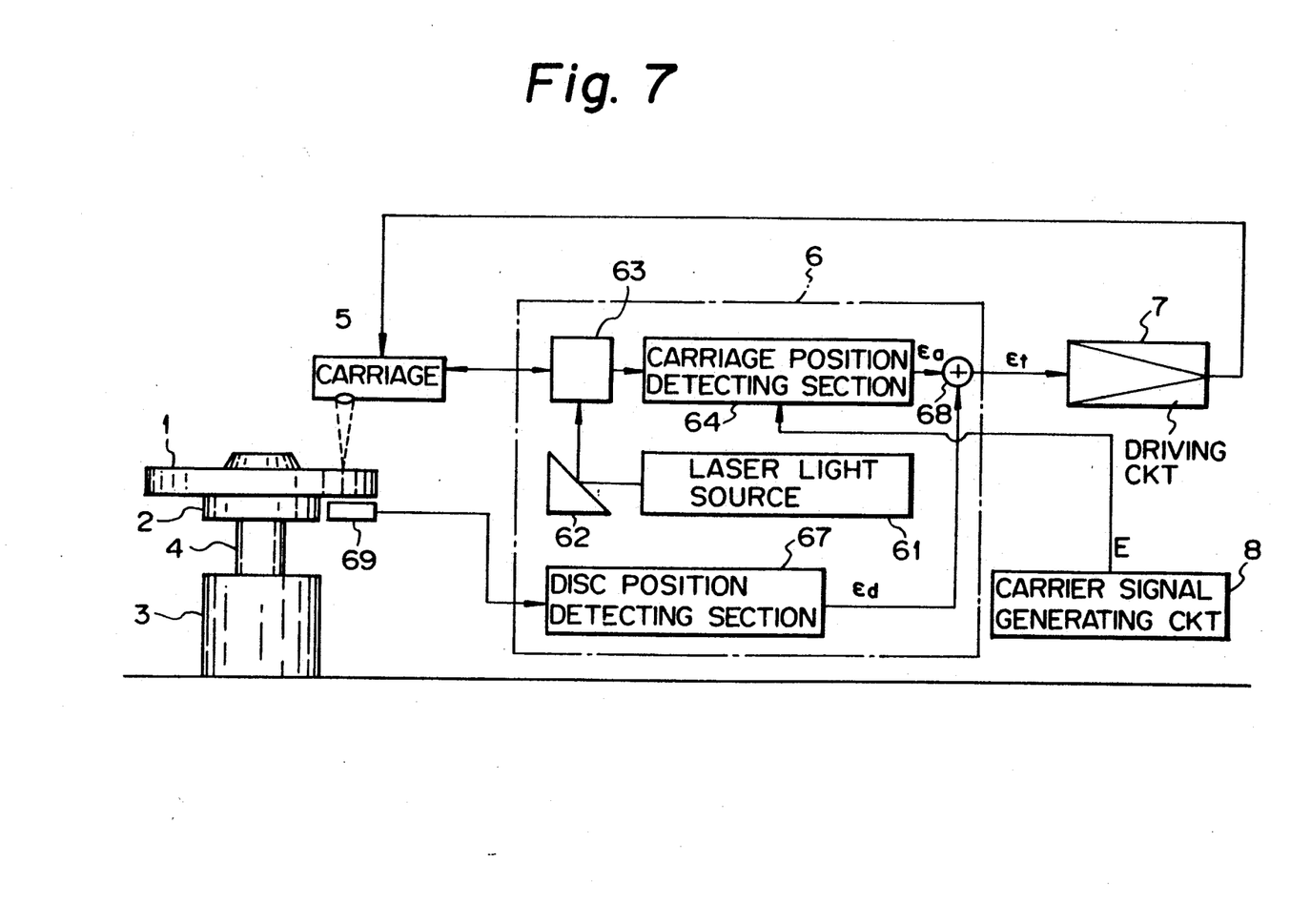
FIG. 7 is a block diagram of the second embodiment of an optical recording apparatus according to the invention.

In the second embodiment shown in FIG. 7, the deviation amount of the disc 1 is detected by using an electrostatic capacity sensor 69 provided near the turntable 2. Specifically, since a gap between the turntable 2 and the sensor 69 changes due to the vibration of the spindle motor 3, the deviation amount of the disc 1 can be indirectly detected by detecting the electrostatic capacity of the gap. In the disc position detecting section 67, therefore, the disc error signal can be obtained. The carriage 5 is translated so that both of the carriage error signal and the disc error signal are maintained to 0 in a manner similar to the first embodiment, and the signal can be recorded while an accurate track spacing is maintained. In the above case, however, the turntable 2 must be formed by a metal because the electrostatic capacity is detected.

In the second embodiment as well, the arrangement can be employed in which the sensor 69 is arranged near the rotary shaft 4 and an electrostatic capacity in a gap between the sensor and the rotary shaft 4 is detected. Since the rotary shaft 4 is formed by a metal in usual cases, no problem will occur even if the turntable 2 is made of a non-metal material such as a resin or the like. The sensor to detect the deviation amount of the disc 1 is not limited to the electrostatic capacity sensor 69 but any other sensors which can detect a distance such as magnetic sensor, proximity sensor, and the like can be also used.

As described above, in the optical recording apparatus according to the invention, when an information signal is recorded by irradiating a laser beam onto an optical recording disc, an error signal is obtained by combining the carriage error signal corresponding to the deviation of the irradiating position of the carriage operating as irradiating means in the disc radial direction and the disc error signal corresponding to the deviation of the disc in the radial direction of the disc, so that even in the case where there is an irregular deviation of the rotary shaft due to the vibration of the spindle motor, the signal can be recorded while a predetermined track spacing is maintained.

What is claimed is:

1. An optical recording apparatus comprising:
   rotating driving means for rotating an optical recording disc;
   irradiating means for irradiating a light beam carrying an information signal onto the disc and forming a recording track;
   position detecting means for detecting a position of said irradiating means in a radial direction of said disc and generating a first detection signal;
   first error signal generating means for generating a first error signal having all of its non-zero components existing during a period T1 by comparing said first detection signal with a first predetermined reference value;
   deviation detection means for detecting a deviation of the entire disc in the disc radial direction and generating a second detection signal;
   second error signal generating means for generating a second error signal having all of its non-zero components existing during said period T1 by comparing said second detection signal with a second predetermined reference value;
   adding means for adding the entirety of said first error signal and the entirety of said second error signal to form a composite error signal in such a way that all of said non-zero components of said first error signal are added to time-corresponding non-zero components of said second error signal throughout said period T1; and
   driving means for translating the irradiating means in the radial direction of the disc in accordance with said composite error signal.

2. An apparatus according to claim 1, wherein the deviation detecting means irradiates a laser beam to a side edge surface of said disc for detecting a deviation of the disc.

3. An apparatus according to claim 1, wherein the deviation detecting means irradiates a laser beam to a side edge surface of a turntable which supports the disc for detecting a deviation of the disc.

4. An apparatus according to claim 3, wherein the deviation detecting means has electrostatic capacity detecting means for detecting an electrostatic capacity between said electrostatic capacity detecting means and said turntable for detecting a deviation of the disc.

5. An apparatus according to claim 1, wherein the deviation detecting means irradiates a laser beam to a rotary shaft of the rotating driving means for detecting a deviation of the disc.

6. An apparatus according to claim 5, wherein the deviation detecting means has electrostatic capacity detecting means for detecting an electrostatic capacity between said electrostatic capacity detecting means and said rotary shaft for detecting a deviation of the disc.

* * * * *